United States Patent [19]
Andre

[11] Patent Number: 5,568,949
[45] Date of Patent: Oct. 29, 1996

[54] METHOD OF COUPLING TUBES OR PIPES, AND COUPLINGS OR THE LIKE OBTAINED BY IMPLEMENTING THE METHOD

[75] Inventor: Maxime Andre, St Germain des Pres, France

[73] Assignee: Hutchinson, Paris, France

[21] Appl. No.: 503,847

[22] Filed: Jul. 18, 1995

Related U.S. Application Data

[62] Division of Ser. No. 86,200, Jul. 1, 1993, Pat. No. 5,460,762.

[51] Int. Cl.$^6$ .............................. F16L 33/00; F16L 33/22
[52] U.S. Cl. .................... 285/284; 285/382; 285/256; 285/242; 285/292; 285/156
[58] Field of Search ..................... 285/381, 382, 285/382.2, 256, 242, 21, 284, 292, 254, 925, 156; 29/890.037

[56] References Cited

U.S. PATENT DOCUMENTS

| | | | |
|---|---|---|---|
| 3,572,769 | 3/1971 | Lingl | 285/96 |
| 3,949,461 | 4/1976 | Thastrup. | |
| 3,954,274 | 5/1976 | Grandlic et al.. | |
| 4,090,899 | 5/1978 | Reich | 285/21 A |
| 4,162,093 | 7/1979 | Sigmund | 285/47 |
| 4,313,629 | 2/1982 | Winterholter | 285/256 |
| 4,358,417 | 11/1982 | Beinhauer. | |
| 4,647,716 | 3/1987 | Akiyama et al.. | |
| 4,664,423 | 5/1987 | Rowley | 285/256 |
| 5,002,716 | 3/1991 | Van Dijck | 281/381 |
| 5,030,487 | 7/1991 | Rosenzweig | 285/381 |
| 5,033,775 | 7/1991 | Maite et al. | 285/381 |
| 5,248,171 | 9/1993 | Briet. | |
| 5,411,300 | 5/1995 | Mitsui | 285/381 |
| 5,447,341 | 9/1995 | Härtel et al. | 285/284 |
| 5,460,762 | 10/1995 | Andre | 285/382 |

FOREIGN PATENT DOCUMENTS 3084295  4/1991  Japan .................................. 285/381

Primary Examiner—Eric K. Nicholson
Attorney, Agent, or Firm—Bell, Seltzer, Park & Gibson

[57] ABSTRACT

Tubes or pipes are engaged on an insert and are fixed thereon in sealed manner by molding a plastics material at least over those zones of said tubes or pipes that co-operate with said insert. The plastics material is molded so as to form a cellular material whose expansion is performed so as to give rise to compression forces on said tubes or pipes that ensure that said tubes or pipes are fixed or sealed onto the insert.

13 Claims, 2 Drawing Sheets

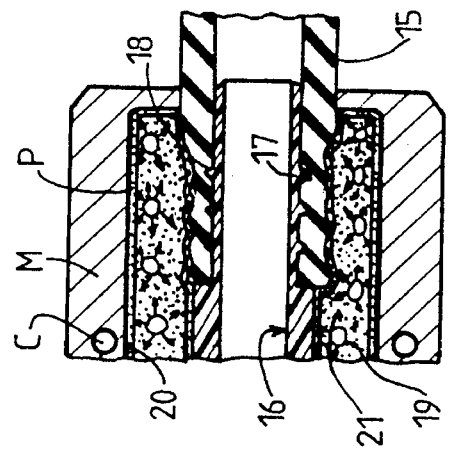
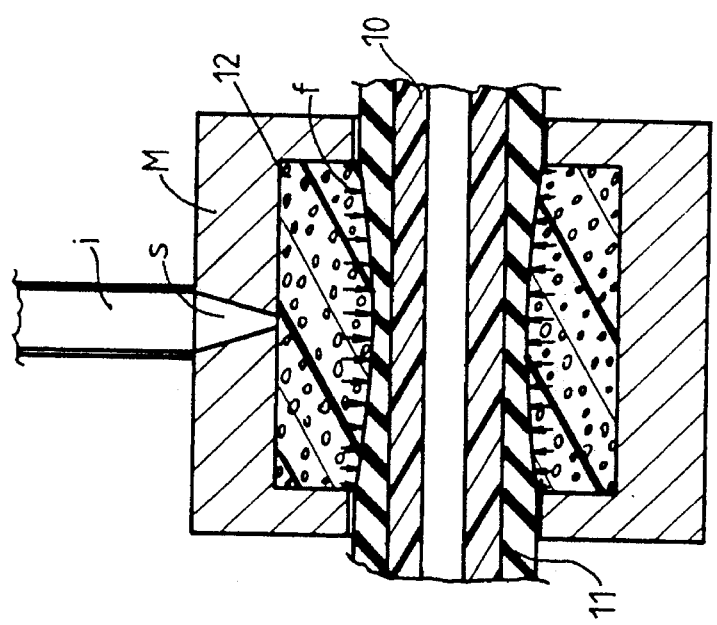
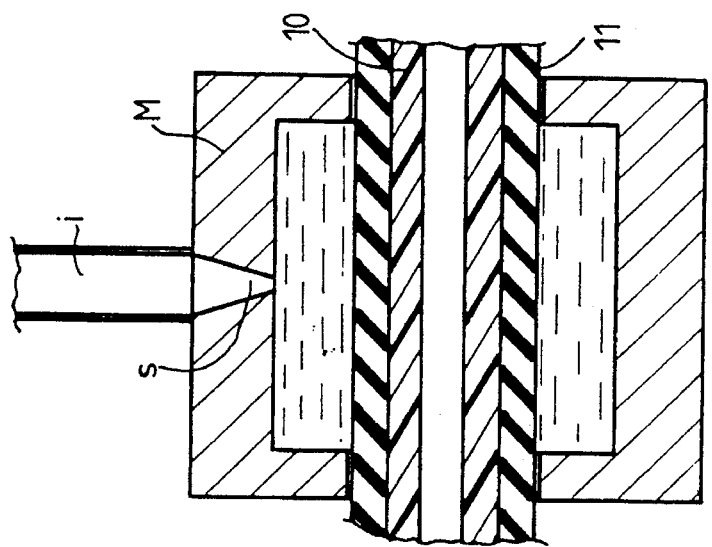

METHOD OF COUPLING TUBES OR PIPES, AND COUPLINGS OR THE LIKE OBTAINED BY IMPLEMENTING THE METHOD

This application is a divisional of application Ser. No. 08/086,200, filed Jul. 1, 1993 now U.S. Pat. No. 5,460,762.

The invention relates to a method coupling tubes or pipes, and also to couplings and like devices obtained by implementing the method.

BACKGROUND OF THE INVENTION

The invention is applicable to manufacturing devices such as branch couplings for flexible tubes or pipes, in particular hoses based on rubber, on plastomers, or on elastomer thermoplastic, and it is also applicable, under certain conditions, to manufacturing such couplings for tubes or pipes that are somewhat more rigid. The invention also extends to manufacturing devices for fixing such tubes or pipes to endpieces, and to manufacturing branches, tapping points, or bundles of ducts in such materials, without the above list being exhaustive. The fields in which the invention may be implemented and where it may be necessary to couple to tubes or pipes together, include for example: building, home appliances, and the vast field of transportation-related industries, in particular the car industry.

In the car industry, rubber-based hoses, and particularly but not exclusively those placed between the engine and the radiator to make up the cooling circuit for the engine, and similarly the bundles for conveying various different fluids (hydraulic or pneumatic fluids such as brake liquid, fuel, etc. . . . ) frequently include branching points that serve either to establish secondary circuits from a main circuit such as stub ducts, branch links, etc. . . . , or else to enable control and/or monitoring functions to be performed such as measuring flow rate or temperature by means of probes, tapping points, etc. Such branch points, referred to below overall by the very general term "couplings or the like" have long been manufactured by engaging the tubes or pipes to be coupled on an insert of appropriate shape and then fixing said tubes or pipes to the insert by means of a very wide variety of types of clamping collar. That long-established technique has progressively been overtaken by crimping techniques as described in DE-3 729 057 or by techniques in which rubber or plastic is overmolded, as explained in FR-A-2 549 196 or FR-A-2 610 073, for example. Although the more recent techniques give satisfaction and enable devices to be obtained that are in widespread use, they can nevertheless sometimes be too expensive and/or too difficult to implement in certain configurations, when the technique is crimping; or they require manufacturing time that is relatively long (when overmolding rubber); or they make use of manufacturing techniques that can be complicated, as when overmolding with common plastics.

OBJECTS AND SUMMARY OF THE INVENTION

Consequently, a general object of the invention is to provide a method of coupling tubes or pipes that is very easily implemented while nevertheless guaranteeing the quality of the resulting couplings and devices, in particular with respect to absence of leakage of the fluid flowing along such tubes or pipes, particularly when the fluid is under pressure.

Another object is the invention is to provide such a method enabling couplings or the like to be obtained in complex shapes, regardless of the tubes or pipes constituting said couplings or the like, and to do this at low cost, in spite of the complexity of such devices.

Another object of the invention is to provide such a method that does not require special manufacturing machines for its implementation and that can also be performed using short manufacturing cycles that are therefore favorable to obtaining high productivity.

It is also an object of the invention to provide such a method enabling couplings or like devices to be obtained directly that are of satisfactory appearance, thereby making them more acceptable to users.

The above objects and others are achieved in a method of coupling tubes or pipes, in particular tubes or pipes based on rubber, on plastomers, or on elastomer thermoplastics, in which said tubes or pipes are engaged on an insert and are held thereon in sealed manner by molding a plastic material at least over zones where said tubes or pipes co-operate with said insert, and in which said plastics material is molded in such a manner as to form a cellular material whose expansion is performed in such a manner as to give rise to pressure forces on said tubes or pipes that ensure that said tubes or pipes are fixed in sealed manner on the insert.

For molding the plastics material which is advantageously performed by injection techniques, such a method makes it possible to use an injection press with tooling and in particular molds as ordinarily used for manufacturing cellular materials.

The method is applicable to tubes or pipes that are optionally reinforced and/or optionally covered with an outer textile sheath and makes it possible to shape the couplings or the like as a function of practical requirements, e.g. to provide branch connections or tapping points simultaneously on one or more tubes or pipes while interconnecting said tubes or pipes by bridging so as to obtain an assembly such as a bundle of tubes or pipes suitable for handling as a unit assembly.

The method also makes it possible, at the place where the plastics material is molded, to unite tubes or pipes that are long and that could not or could only with difficulty be united by the techniques of overmolding rubber, e.g. because of the sizes of vulcanizing autoclaves.

The method also makes it possible to secure parts such as pressure gauges, temperature probes, flow rate meters, drain means, etc. to said tubes or pipes in a single operation with and at the same time as the couplings proper are made on said tubes or pipes.

In a first implementation, the method of the invention provides for forming the cellular material by incorporating an inert gas or a liquid having a low boiling point in the injected polymer material.

In such an implementation, the mixture of plastics material and inert gas or low boiling point liquid is conveyed by means of a screw transporter device into an accumulator where the mixture is kept under pressure to prevent premature expansion, and then after a retaining shutter has been opened rapidly, a moving piston in the accumulator injects the mixture at high speed into the mold. After the mold has been filled, a valve member is closed and expansion takes place inside the mold while the accumulator is being refilled for a subsequent injection cycle.

In another implementation, the plastics material is expanded and the cellular material is formed as a result of a chemical pore-generating agent or inflating agent that decomposes at the molding temperature. The agent is selected as a function of the injected plastics material so as to avoid chemical interactions with said material, and so as to take account of implementation temperatures, of possible reactions with the material from which the mold is made, of the nature of the gaseous products, etc. . . . . .

In an advantageous embodiment, and when the injected plastics material is of the polyamide type, said inflating agent is selected from the family of azodicarbonamides or from the family of tetrazoles, and it is added to the plastics material during a preliminary operation or during the injection process.

Since this implementation using an inflating agent is simpler to perform than the implementation using an inert gas or a low boiling point liquid, and since it is performed using ordinary injection machines, it is preferred. It also makes it possible to obtain better control over the regularity and the uniformity of the products obtained, in particular with respect to the density of the cellular material, the density gradient between the skin and the core of said material, and the size and distribution of the cells, while simultaneously conferring a satisfactory surface state to the manufactured device, particularly when injection is performed at medium to high pressure.

A coupling or like device for tubes or pipes, in particular tubes or pipes made of rubber, plastomers, or elastomer thermoplastics, comprising at least one insert on which the tubes or pipes are engaged, and a molding of plastics material that encloses in sealed manner at least those portions of said tubes or pipes that co-operate with the insert, is characterized, according to the invention, in that said plastics material is in the form of a cellular material that is expanded and rigid and that exerts compression forces on said tubes or pipes ensuring that said tubes and pipes are fixed or sealed on the insert.

The cellular material of the closed-cell rigid-foam type has an overall density that may lie in the range about one-third of the pure plastics material that is used, to said density of the pure plastics material minus a few percent.

Thus, because of the presence of the cellular material, a coupling or like device of the invention benefits from relatively low thermal conductivity, good resistance to shocks which are well absorbed by the cellular structure which reduces propagation of possible cracks, savings in material, and a higher stiffness/weight ratio than that of known prior devices. To increase the mechanical characteristics of couplings or like devices of the invention, e.g. characteristics of rigidity, hardness, creep resistance, traction strength, or resistance to deformation under load, while improving its cellular structure, and also while simultaneously reducing molding cycle times, the invention provides for reinforcing the cellular material with fillers, advantageously glass beads and/or fibers.

When fillers are used, they are present at a concentration lying in the range 5% to 95% by weight of the injected plastics material.

In a preferred embodiment, the fillers represent 5% to 25% by weight of the injected plastics material.

According to another characteristic of the invention, the injection molding of the plastics material is performed in such a manner that the couplings or like devices have a surface skin in which the depth of roughness is of the same order as that obtained when injection molding compact plastics material, i.e. of the order of a few microns.

BRIEF DESCRIPTION OF THE DRAWINGS

The invention will be well understood from the following description given by way of example and made with reference to the accompanying drawings, in which:

FIGS. 1 to 3 show the coupling method of the invention and show a coupling obtained by implementing the method.

MORE DETAILED DESCRIPTION

Figure 4:
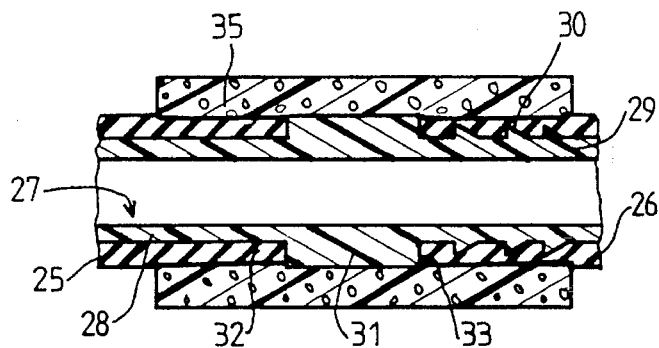
FIGS. 4 to 8 show other shapes of couplings obtained using the method of the invention.

Reference is made initially to FIGS. 1 to 3 which are diagrams showing the method of the invention for coupling together an endpiece and a tube or pipe made of rubber, plastomer, or an elastomer thermoplastic. As shown in FIGS. 1 and 2, the coupling method of the invention begins by engaging a tube or pipe 11 onto an insert 10, after which said tube or pipe is fixed to the insert and the fixing therebetween is sealed by means of a cellular material 12 molded onto the tube or pipe 11 in such a manner as to give rise to compression forces on the said tube or pipe (as represented by arrows f in FIG. 2) that provide both said fixing and said sealing. To do this, the invention provides for placing the insert 10 and the tube or pipe 11 inside a mold M (provided with at least one device i for injecting plastics material that opens out into the mold via an injection sill s, and also provided with vent holes) and then in injecting a polymer material into said mold where it is transformed, in situ, into a cellular material.

In a first implementation of the method, an inert gas such as nitrogen, or freon, or a low boiling point liquid such as a chlorinated hydrocarbon is incorporated in the injected plastics material, the mixture of plastics material and inert gas being kept under pressure until it is injected into the mold M where expansion takes place simultaneously with cooling of the molded material. The material which is confined in the mold "inflates" against the tube or pipe 11 to form the cellular material 12 (FIG. 2) and in so doing develops compression forces that are sufficient for ensuring fixing and sealing of the tube or pipe on the insert.

In a second implementation which leads to the same result, the expansion of the plastics material to form the cellular material 12 is the result of a chemical pore-generating agent or inflating agent decomposing at the molding temperature. The agent is generally mixed with the injected plastics material during a preliminary operation or during the injection process or by compounding. In the first case, the inflating agent and the plastics material may be mixed dry, or they may be mixed in a barrel together with an adhesive agent, whereas in the second case the agent is inserted by means of automatic mixers and metering devices mounted on the injection press, or in the third case the agent is inserted into the molten plastics material which, after being homogenized, is extruded and then granulated to serve as raw material for the injection press feeding the device i.

Whichever technique is implemented, performing the method by decomposing an inflating agent means that the quantity of material injected into the mold is less than or at most equal to the volume of the mold cavity, and also that the injection sills s are as small as possible and as close as possible to the mold cavity, in contrast to the method used for injecting a compact plastics material. In addition, injection is performed in such a manner that the plastics material that is melted and transported by the plastification screw remains under pressure so as to avoid premature expansion and the formation of gas bubbles, with the highest possible retention of gas close to the outlet of the injection nozzle being obtained by applying heat to said nozzle, where the decomposition effect on the inflating agent of the added heat is counterbalanced by an increase in pressure.

Injection is performed at high speed (likewise unlike the techniques implemented for molding compact plastics materials) with the cooling and retention time in the mold being selected so as to obtain a surface skin of satisfactory appearance, in particular a skin where the depth of its roughness is of the same order as that obtained while injection molding ordinary plastics material, i.e. a few microns. The temperature of the mold also contributes to obtaining a skin of good quality on the cellular material, insofar as the structure of the plastics material depends on its rate of crystallization which is itself a function of the temperature gradient that is established between the mold and the molten material injected therein, whereas the size of the gas bubbles and thus of the cells is linked to the speed at which the injected material cools.

Consequently, the invention proposes that the mold M should be provided with channels C through which a regulating fluid is circulated (see FIG. 3), thereby making it possible to give the inside wall of the mold p a temperature that is not too high, so as to facilitate crystallization, but which is not too low either so as to avoid the injected material "freezing" on its surface.

Given that obtaining a satisfactory cellular material depends not only on physical characteristics as mentioned above but also on the nature of the pore-generating inflating agent, the agent is selected so as to make it possible to obtain an expanded cellular material that is rigid, having closed cells, obtained with good gas yield, without any risk of chemical interaction between the polymer material and the pore-generating agent, and without any substances being evolved that are toxic for manufacturing personnel or corrosive for the molds, the decomposition temperature of the pore-generating agent also being adapted to the shaping temperature of the injected polymer material.

Providing the above-mentioned conditions are satisfied, the method may be implemented on tubes or pipes 11 of all types, that may optionally be reinforced, and that may optionally be coated in an outer textile sheath, and it may be performed with inserts 10 of a wide variety of shapes and kinds, e.g. they may be made of metal, of optionally reinforced plastics material, or of plastics material filled with fibers or the like.

In the embodiment shown in FIG. 3, a flexible tube or pipe 15, e.g. a hose made of a rubber based on EPDM, of plastomer, or of an elastomer thermoplastic material, is united with an endpiece 16 whose end portion 17 is thinner than the remainder of the endpiece and has "Christmas-tree" projections 18 on its outside surface. When the relative dimensions of the inside diameter of the tube 15 and the outside surface of the portion 17 of the endpiece ensures sufficient cohesion to enable the assembly of the tube fitted on the endpiece to be handled as a unit, said assembly is placed in the mold M. If cohesion is insufficient, then the endpiece is provided with a weak adhesive prior to the tube being fitted thereon, and then, as before, the assembly is placed in the mold M. After the polymer material plus the inflating agent has been injected under the conditions explained above, a cellular material 19 is obtained in the mold at a density that decreases from the density of its skin 20 (in contact with the mold, the endpiece 16, and the tube 15) going towards its core 21, with the tube or pipe being fixed in sealed manner on the endpiece as a result of the compression forces exerted by the injected plastics material transforming into said cellular material whose density may vary from about one-third that of the compact plastics material to substantially the density of the compact material minus a few percent, with the variation being a function of practical requirements concerning looked-for characteristics of shock resistance, thermal conductivity, etc. . . . . .

Since good results can be obtained with respect to fixing and sealing a flexible tube or pipe on an insert even at low densities, it may sometimes be advantageous to compensate for the decrease in certain mechanical characteristics due to the cellular nature of the material by adding fillers, in particular glass beads and/or fibers. Thus, by adding glass beads and/or fibers at concentrations lying in the range 5% to 95% by weight of the injected plastics material, it is possible to increase bending modulus, traction strength, and the temperature of deformation under load, and the manufacturing cycle is shortened insofar as the skin of the cellular material takes less time to become sufficiently rigid to enable it to withstand the internal pressure developed during expansion. A preferred filler concentration lies in the range 5% to 25% by weight of the injected plastics material.

In the embodiment of FIG. 4, the invention is applied to coupling together two tubes or pipes 25 and 26 that are in alignment by means of an insert 27 constituted by a tubular element whose end portions 28 and 29 (end portion 29 having projections 30) co-operate with a middle zone 31 to provide abutments 32 and 33 for positioning the tubes or pipes 25 and 26. After the pipes have been engaged on the insert 27 so as to bring their ends into abutment against the abutments 32 and 33, said tubes are fixed in sealed manner onto the insert by means of a sleeve 35 of cellular material made in the manner described above. The coupling obtained in this way provides excellent characteristics of resistance to the tubes being torn off the insert and of resistance to internal pressure, including during the pulse pressure cycles specified by car manufacturers.

Figure 5:
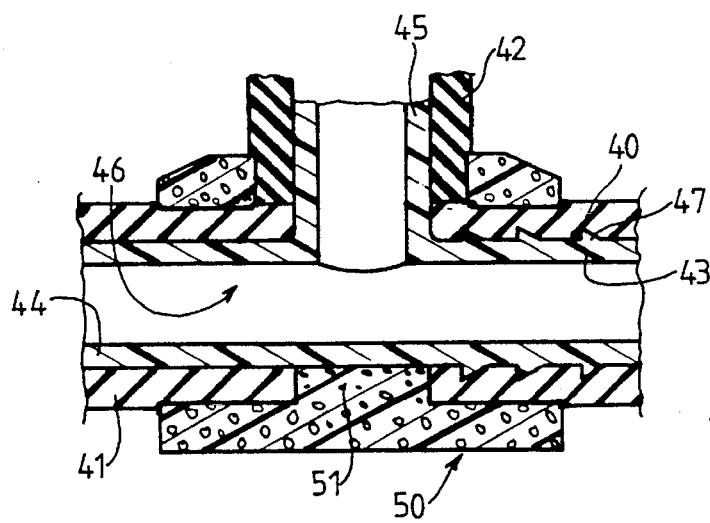

In the embodiment of FIG. 5, three tubes or pipes 40, 41, 42 are engaged on respective branches 43, 44, and 45 of a T insert 46 whose branch 43 is advantageously provided with "Christmas-tree" projections 47. The pipes are fixed in sealed manner on the insert by means of a sleeve 50 of cellular material that envelops portions of the pipes over the zones where they co-operate with the insert, and which also extends, as shown at 51, into the gap between the ends of the axially aligned pipes 43 and 44.

Figures 6, 7, 8:
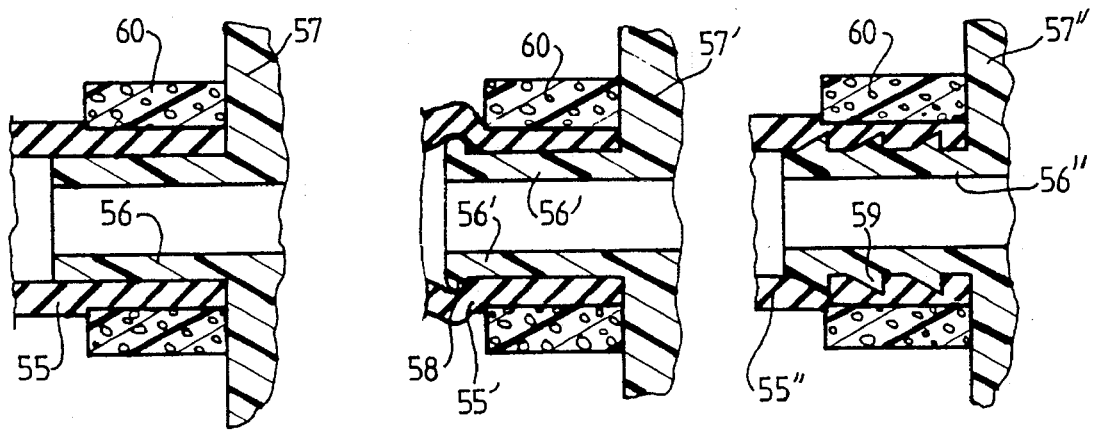

In the embodiments of FIGS. 6 to 8, a tube or pipe 55, 55', or 55" based on rubber, on plastomer, or on elastomer thermoplastic is fixed in sealed manner on an endpiece 56, 56' or 56" projecting from a wall 57, 57', or 57" which may be constituted, for example, by the wall of a car radiator water tank, or the like. Whether the endpiece is completely smooth and cylindrical as shown at 56, or has a terminal rim 58 as shown in FIG. 7, or has "Christmas-tree" projections 59 as shown in FIG. 8, the tube or pipe 55, 55', or 55" is fixed in sealed manner on said endpiece by means of a sleeve of cellular material 60 which is expanded in such a manner as to give rise to compression forces on the tube or pipe 55, 55', or 55" that ensure that the tube or pipe is fixed in sealed manner on the endpiece.

The invention is not limited to the embodiments described above but is applicable to making devices such as bundles of tubes, drain valves, or for installing measurement members such as pressure gauges, temperature probes, etc. in such devices.

Another application lies in coupling together tubes or pipes made of materials that are not as flexible as rubber, providing that special operating conditions are then observed, for example relating to shape or temperature, e.g. with temperature serving to soften to some extent the tubes or pipes that are to be assembled on an insert, etc. . . . . .

Good results have been obtained by the method of the invention when implemented in the manner specified in the following non-limiting examples.

EXAMPLE 1

Three polychloropropene pipes having an inside diameter of 5 mm were connected to a T insert of 6.6 polyamide reinforced with 30% glass fibers by engaging the pipes on the insert and then molding a 6,6 polyamide containing 1.3% of an azodicarbonamide type inflating agent onto the resulting assembly.

With a mold temperature of about 80° C. and an injection temperature of about 30° C., the total duration of the manufacturing cycle was about 30 seconds.

Six samples were then taken from the couplings made in this way and split into two groups of three couplings each, with the samples then being subjected to pressure testing on a cyclically varying pulse test bench.

After the samples had been subjected to 25,000 cycles, the force required for tearing the pipes off the insert was measured: the measured values lay in the range 21.1 dan to 25.4 daN, about a mean value of 23.7 daN.

EXAMPLE 2

T couplings like to those described in Example 1 but using pipes having an inside diameter of 9 mm were made using a polymer material of the 6,6 polyamide type including glass fibers constituting a 30% filler.

The polymer material filled in this way plus 1.3% of the same inflating agent as used in Example 1 was then injected as in that example.

Two groups of three couplings each obtained in this way were then subjected to tear-off tests after each of them had been subjected to 25,000 cycles of dynamic pressure stresses.

The measured tear-off forces lay in the range 17.6 daN to 23.8 daN about a mean value of 20.33 daN.

I claim:

1. A coupling device for tubes or pipes made of rubber-type material, comprising at least one insert on which the tubes or pipes are engaged, and a molding of plastics material that encloses in sealed manner at least those portions of said tubes or pipes that are engaged on the insert, wherein said plastics material is in the form of a cellular material that is expanded and rigid and that exerts compression forces on said tubes or pipes ensuring that said tubes or pipes are fixed and sealed on the insert and wherein the cellular material is reinforced by fillers.

2. A coupling device according to claim 1, wherein the fillers constitute 5% to 95% by weight of the injected plastics material.

3. A coupling device according to claim 2, wherein the fillers constitute 5% to 25% by weight of the injected plastics material.

4. A coupling device according to claim 1, wherein the cellular material has a surface skin of roughness having a depth of the order of about a few microns.

5. A coupling device according to claim 1, wherein the density of the cellular material lies in the range of about one-third the density of pure plastics material to said density minus a few percent.

6. A coupling device for a tube made of rubber-type material, comprising at least one tubular rigid insert on which a portion of the tube is engaged, and a molding of plastics material that encloses in a sealed manner at least the said portion of the tube that is engaged on the insert, wherein said plastics material is in the form of rigid cellular material that has been expanded around the portion of the tube and set within a mold and that has fixed and sealed the portion of the tube on the insert by the pressure resulting from the expansion of the cellular material in the mold.

7. A coupling device according to claim 6, wherein the cellular material is reinforced by fillers.

8. A coupling device according to claim 7, wherein the fillers constitute 5% to 95% by weight of the injected plastics material.

9. A coupling device according to claim 8, wherein the fillers constitute 5% to 25% by weight of the injected plastics material.

10. A coupling device according to claim 6, wherein the cellular material has a surface skin of roughness having a depth of the order of about a few microns.

11. A coupling device according to claim 6, wherein the density of the cellular material lies in the range of about one-third the density of pure plastics material to said density minus a few percent.

12. A coupling device for tubes or pipes made of rubber-type material comprising at least one insert on which the tubes or pipes are engaged, and a molding of plastics material that encloses in sealed manner at least those portions of said tubes or pipes that are engaged on the insert, wherein said plastics material is in the form of a cellular material that is expanded and rigid and that exerts compression forces on said tubes or pipes ensuring that said tubes or pipes are fixed and sealed on the insert, wherein the cellular material has a surface skin of roughness having a depth of the order of about a few microns.

13. A coupling device for tubes or pipes made of rubber-type material, comprising at least one insert on which the tubes or pipes are engaged, and a molding of plastics material that encloses in sealed manner at least those portions of said tubes or pipes that are engaged on the insert, wherein said plastics material is in the form of a cellular material that is expanded and rigid and that exerts compression forces on said tubes or pipes ensuring that said tubes or pipes are fixed and sealed on the insert, wherein the density of the cellular material lies in the range of about one-third the density of the unexpanded plastics material to substantially said density.

* * * * *

UNITED STATES PATENT AND TRADEMARK OFFICE
CERTIFICATE OF CORRECTION

PATENT NO. : 5,568,949
DATED : October 29, 1996
INVENTOR(S) : Andre

It is certified that error appears in the above-identified patent and that said Letters Patent is hereby corrected as shown below:

On the cover page, column 1, insert -- Foreign Application Priority Data: 92 08222 France July 3, 1992 --.

On the cover page, column 2, line 9, "Maite et al." should be -- Matte et al. --.

On the cover page, column 2, under FOREIGN PATENT DOCUMENTS, "3084295" should be -- 3-84295 --.

On the cover page, column 2, under FOREIGN PATENT DOCUMENTS, the following patent documents should be included:

```
 --      243,216      10/1987     EPO
      2,271,487      12/1975     France
      3,400,638       7/1985     Germany    --.
```

Column 7, line 20, "30°" should be -- 300° --.

Column 7, line 28, "dan" should be -- daN --.

Signed and Sealed this

Twentieth Day of May, 1997

Attest:

BRUCE LEHMAN

Attesting Officer      Commissioner of Patents and Trademarks